United States Patent [19]
Horlenko

[11] 3,718,545
[45] Feb. 27, 1973

[54] DISTILLATION PROCESS FOR RECOVERING SUBSTANTIALLY ANHYDROUS FORMIC ACID FROM AQUEOUS SOLUTIONS

[75] Inventor: Theodore Horlenko, Corpus Christi, Tex.

[73] Assignee: Celanese Corporation, New York, N.Y.

[22] Filed: April 26, 1971

[21] Appl. No.: 138,569

[52] U.S. Cl. .................203/15, 203/68, 203/70, 203/84, 260/542
[51] Int. Cl. ....................B01d 3/36, C07c 53/02
[58] Field of Search ......260/542; 203/68, 70, 15, 16, 203/84

[56] References Cited

UNITED STATES PATENTS

| | | | |
|---|---|---|---|
| 2,859,154 | 11/1958 | Othmer | 203/70 |
| 1,896,100 | 2/1933 | Ricard et al. | 203/15 |
| 3,012,948 | 12/1961 | Horvitz et al. | 203/84 |
| 3,024,170 | 3/1962 | Othmer et al. | 260/542 |
| 1,668,380 | 5/1928 | Ricard | 203/15 |

*Primary Examiner*—Wilbur L. Bascomb, Jr.
*Attorney*—Marvin Turken, T. J. Morgan, C. E. Miller, K. A. Genoni and R. M. Pritchett

[57] ABSTRACT

Substantially anhydrous formic acid is recovered from aqueous solution by azeotropically distilling the solution with a non-aromatic hydrocarbon entrainer which boils between about 60° and 120° C. Paraffinic and alicyclic hydrocarbons boiling between about 80° C and about 115° C are particularly suitable entrainers. The residue of the azeotropic distillation, containing formic acid and water is a formic acid:water ratio at least as great as that obtaining in any ternary azeotrope of formic acid, water, and the entrainer, can then be topped to separate water as a distillate from the formic acid, the residue from the topping distillation then being recycled to the azeotropic distillation. The process can be employed with feedstocks containing acetic acid in addition to formic acid and water.

14 Claims, 1 Drawing Figure

3,718,545
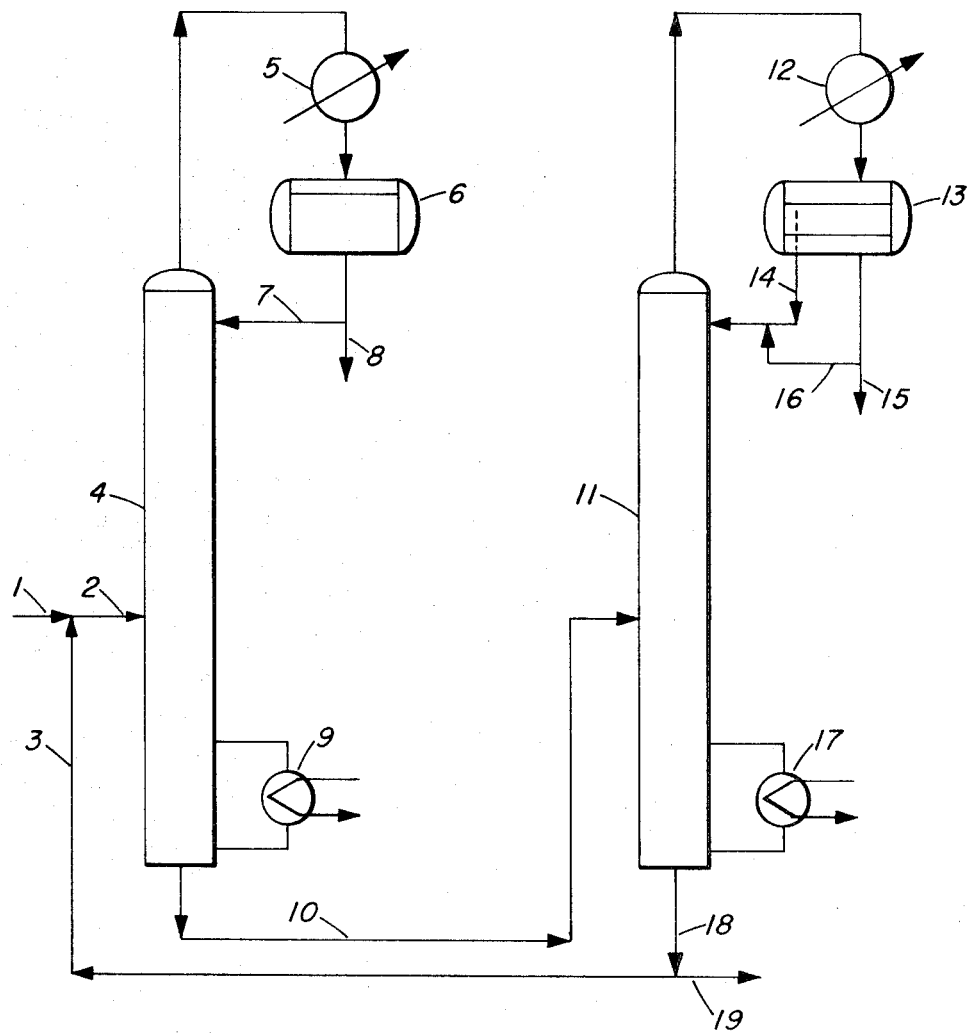
INVENTOR.
THEODORE HORLENKO
BY R. M. Pritchett
AGENT

DISTILLATION PROCESS FOR RECOVERING SUBSTANTIALLY ANHYDROUS FORMIC ACID FROM AQUEOUS SOLUTIONS

BACKGROUND OF THE INVENTION

Aqueous solutions of formic acid, typically also containing appreciable quantities of acetic acid, are encountered in the crude product fractions derived from the oxidation, e.g., in the liquid phase, of hydrocarbons such as butane to produce oxygenated derivatives such as acetic acid. Such a mixture is discussed in a paper by Hunsmann and Simmrock in "Chemie-Ing.-Techn.," Volume 38, No. 10 (1966), which points out that water, formic acid, and acetic acid form a homogeneous non-ideal three-component system the separation of which presents considerable difficulty. It is also known that formic acid and water form a binary azeotrope such that the recovery of formic acid from two-component mixtures of formic acid and water is also difficult.

Heretofore the recovery of anhydrous formic acid from aqueous solutions has been accomplished by employing azeotroping agents to entrain the water away from the formic acid; that is, water is removed in the distillate while the formic acid remains as the residue. When acetic acid is also present, the approach taken in the prior art has been to use a first azeotropic distillation to remove water as distillate from the formic and acetic acids, following by separating the resulting anhydrous residue into formic acid and acetic acid in a second azeotropic distillation with a second entraining agent. This is the approach taken by Hunsmann and Simmrock in the paper just discussed. Such methods are effective, but have the drawback, for example, that heat requirements in the distillation process are comparatively high inasmuch as the entraining agent must be vaporized as well as the component being entrained. That is, considering the system in which acetic acid is present as well as water and formic acid, the need to azeotropically distill both water and formic acid results in substantially increased distillation heat requirements as compared with the conditions which would obtain if one of the azeotropic distillations could be replaced by a simple non-azeotropic distillation. Also, even in effecting the separation of formic acid from water in a system in which acetic acid is not present, the processes of the prior art have involved the use of azeotroping agents which are expensive or which entail some hazards in use (e.g. ethers, which can form peroxides and which are more expensive than, for example, simple hydrocarbons).

Insofar as hydrocarbon entraining agents are concerned, toluene has been employed to remove formic acid from acetic acid as an azeotropic distillate, but only in the case of acetic acid-formic acid mixtures which are comparatively low in water content (e.g., mixtures containing about 5–10 weight percent water). For mixtures containing substantial amounts of water, toluene azeotroping has been found to be deficient in that it is quite difficult to obtain a substantially anhydrous distillate. That is, the toluene-water binary azeotrope has a strong tendency to distill over with the toluene-formic acid azeotrope. Similar conditions have been observed to obtain with n-octane, and benzene also does not perform satisfactorily. The result has been that, to recover substantially anhydrous formic acid from admixtures with comparatively large amounts of water, the prior art has relied on the comparatively complicated processes which employ two azeotroping columns (when acetic acid is also present) or else the comparatively expensive entraining agents such as ethers.

It is an object of the present invention to provide an improved method for recovering substantially anhydrous formic acid from aqueous solutions containing comparatively large amounts of water. It is another object to provide a method for recovering substantially anhydours formic acid from mixtures of formic acid, acetic acid, and water which does not require for the use of two azeotropic distillation steps. It is yet another object to provide an economical method for recovering substantially anhydrous formic acid from a mixture of formic acid, acetic acid, and water derived from the liquid phase oxidation of hydrocarbons. Other objects will be apparent from the following detailed description.

SUMMARY OF THE INVENTION

It has now been discovered that substantially anhydrous formic acid can be recovered from an aqueous solution, which may also contain acetic acid, by azeotropically distilling the formic acid out of the aqueous solution with an entrainer which is immiscible with formic acid and with water and which has a boiling point between about 60° C and about 120° C, particularly suitable entrainers being members of the group consisting of paraffinic and alicyclic hydrocarbons. Unsubstituted olefins can be employed, although they tend to darken in use, indicating some degree of chemical reaction under conditions prevailing during the distillation. A heptane cut boiling within the specified range is particularly suitable, e.g., n-heptane itself or one of the commercially-available "heptanes" which contain other heptane isomers, as well as seven carbon atom alicyclic compounds in addition to the n-heptane itself. Octanes boiling within the specified range are equally suitable. The azeotropic distillation produces a distillate comprising formic acid and the entrainer which, upon being allowed to stand, separates into two liquid phases, one comprising predominantly the entrainer and the other consisting essentially of substantially anhydrous formic acid, the product being drawn from the formic acid phase. The azeotropic distillation column is operated in such a manner as to produce a homogenous aqueous residue comprising water and formic acid, with the formic acid content of the residue being so controlled that the formic acid:water therein is at least as high as the formic acid:water ratio obtaining in any ternary azeotrope of formic acid, water, and the entrainer which may exist at the pressure being employed in the azeotropic distillation column. The number of plates, reflux ratio, and distillate:residue split provided in the azeotropic distillation will be discussed more fully hereinbelow.

In a particularly advantageous embodiment of the invention, the azeotropic distillation column is operated in conjunction with a preliminary topping column, as shown in the drawing, in which such amounts of water contained in the aqueous feedstock as can be removed by simple distillation are topped out non-azeotropically. By operating the two columns together in this manner it is possible to dispense entirely with the need to remove water as an azeotropic distillate, which minimizes the consumption of heat in the distillation process and also eliminates the need for a separate water-azeotroping column and the handling of a separate water-azeotroping entrainer.

When the aqueous feedstock contains acetic acid, it can be removed from the system either by drawing off a portion of the residue stream drawn from the azeotroping tower or else by allowing the preliminary topping tower to operate with a distillate:residue split such that acetic acid is allowed to distill overhead and so be removed in the topping tower distillate.

DESCRIPTION OF THE PREFERRED EMBODIMENT

The drawing illustrates the preferred embodiment of the invention, in which the azeotropic distillation which is at the heart of the invention is operated in conjunction with the preliminary topping distillation which is a preferred adjunct. As the aqueous formic acid-containing feedstock there is employed an aqueous stream derived from the product-recovery sections of a plant in which butane is oxidized in the liquid phase to produce oxygenated derivatives including largely acetic acid and containing, by weight, about 50 percent formic acid, 5 percent acetic acid, 40 percent water, and the remainder organic light ends including largely ethyl acetate and methyl ethyl ketone. This stream enters the distillation system through conduit 1 and is mixed with aqueous formic acid-containing recycle drawn from the base of the azeotrope tower 11 by way of conduit 3, with the resulting mixture being introduced into topping tower 4 through conduit 2. Topping tower 4 is a conventional distillation column, containing advantageously the equivalent of about 50 operating trays, and provided with a condenser 5, a distillate receiver 6, and a reboiler 9. Distillate collected in receiver 6 is predominantly water (i.e., about 80 weight percent), but it also contains the light ends initially present in the aqueous feedstock and, typically, a comparatively small fraction of the formic acid contained in the feedstock. Additionally, when the feedstock contains acetic acid, topping tower 4 can be operated is desired to purge from the system all or a portion of the acetic acid fed into tower 4 by allowing it to distill overhead in the distillate and be ultimately withdrawn from the system through conduit 8. The column is refluxed through conduit 7 in a conventional manner. The reflux ratio and the distillate:residue split in column 4 are controlled in accordance with conventional distillation techniques to produce, as the topped residue withdrawn from the column through conduit 10, the well-known maximum-boiling azeotrope of formic acid and water which contains, at atmospheric pressure, approximately 77.5 percent formic acid and 22.5 percent water by weight. Acetic acid may also be present, resulting in a mixture in which the formic acid:water ratio is still essentially 77.5:22.5 but in which the absolute concentrations of these components are reduced by the amount of acetic acid dilution. It will be recognized that the topping column will typically not approach the residue concentration of formic acid and water just named completely; that is, the concentration of formic acid will normally be somewhat lower than 77.5 percent, e.g., about 75 percent.

The topped material drawn from the base of column 4 through conduit 10 is forwarded to azeotroping column 11, which is equipped with condenser 12, distillate receiver-decanter 13, and reboiler 17. This column advantageously contains, below the feed point, the equivalent of at least about 15 operating stripping trays and, above the feed point, the equivalent of at least about 40 operating rectifying trays, more preferably at least about 50 trays, and most preferably about 60 trays. The column can be operated satisfactorily at atmospheric pressure, although super-atmospheric and sub-atmospheric pressure operation is not precluded.

In azeotroping column 11 the aqueous solution of formic acid introduced through conduit 10 is azeotropically distilled in the presence of an entrainer which is maintained in the rectification section of the column whereby the vapors withdrawn from the head of the column to be condensed in condenser 12 consists essentially of the entrainer and formic acid with only a minimal quantity of water. If acetic acid is present in the feed stream, some of it can be allowed to distill overhead with the formic acid if desired, but this can also be avoided if desired by controlling reflux ratios and distillate:residue split as will be discussed more fully hereinbelow. As will be explained, the column can be so controlled that the vapors drawn from the head of the column contain only minimal quantities of acetic acid and water.

Boilup heat is supplied to the column by reboiler 17 at a rate sufficient to maintain the azeotropically-stripped residue withdrawn through conduit 18 in a homogeneous condition, i.e., consisting only of an aqueous liquid phase and containing none of the entrainer other than minimal quantities which may be dissolved therein as distinguished from being present as a separate organic liquid phase. The azeotroping column residue contains, in addition to any acetic acid which may be present, formic acid and water in a formic acid:water ratio which is at least as high as that obtaining in the formic acid:water:entrainer ternary azeotrope composition obtaining at the pressure at which the azeotrope tower is operated. At atmospheric pressure, for example, this ratio is approximately 2.3, and the residue stream withdrawn through conduit 18 will typically contain formic acid and water in a ratio somewhat higher than 2.3. The withdrawn residue is recycled to the topping column through conduit 3 as previously mentioned. Optionally, a portion of this recycle material is withdrawn through conduit 19 for the purpose of preventing a continuing buildup of acetic acid in the system, if acetic acid is contained in the initial feedstock. Such drawoff is not essential, however, since it is possible as an alternative to operate the topping column in such a manner as to take acetic acid overhead in the distillate and so ultimately withdraw it from the system in this manner.

Within azeotrope column 11 the entrainer acts to azeotrope formic acid out of the feedstock and into the distillate without, surprisingly, distilling over any appreciable quantity of water as would ordinarily be expected from the fact that the entrainers employed in the process form low-boiling water azeotropes and therefore would ordinarily be expected to bring water into the distillate. The vapor withdrawn from the head of column 11 is condensed in condenser 12 and allowed to stand in distillate receiver 13, in which the condensate separates into two liquid phases, one consisting essentially of substantially anhydrous formic acid and the other comprising predominantly the entrainer. A portion of the formic acid phase is withdrawn from the system through conduit 15 as the final product, typically containing about 99 percent formic acid and approximately 0.1 percent water or less. A substantial formic acid reflux is also drawn from the formic acid phase in the distillate receiver and is returned to the head of the column through conduit 16 together with an entrainer reflux which is drawn from the distillate receiver and returned to the head of the column through conduit 14.

The following are additional explanatory comments regarding nature of the entrainer and the operating conditions within the two distillation towers, of which the azeotroping tower is central to the invention in its most basic embodiment.

First, as regards the formic acid entrainers, non-aromatic hydrocarbons having an atmospheric boiling point between about 60° C and about 120° C are generally suitable, with those boiling between about 80° C and 115° C being preferred because they entrain more formic acid per unit quantity of entrainer than do the lower-boiling entrainers and because they entrain less water than entrainers boiling around 120° C. Aromatic compounds and halogenated hydrocarbons, even though boiling within the desired range, have not been found to be effective entrainers. Although ethylenically unsaturated, especially mono-unsaturated, hydrocarbons boiling in the specified range can be employed, paraffinic hydrocarbons and saturated alicyclic hydrocarbons are particularly suitable since they are more stable chemically. The heptanes, both aliphatic and alicyclic, are quite suitable, including both n-heptane and its isomers as well as the alicyclic saturated compounds having about seven carbon atoms and boiling within the named range. Technical grade "heptanes" comprising a mixture of $n$-heptane, branched heptanes, and seven carbon atom saturated alicyclic compounds are useful and readily available. Methyl cyclohexane is quite applicable. Octanes having the specified volatility characteristics are as useful as the heptanes, including for example 2,2,4-trimethylpentane and 2,4- and 2,5-dimethylhexane. Normal octane itself has too high a boiling point.

In the operation of the azeotrope column certain considerations of reflux ratio and concentration of the dissolved components in the material being distilled are pertinent, as is the number of distillation trays or their equivalent in the column. First, regarding concentrations of water and formic acid, the azeotroping phenomenon on which the process is based is particularly noticeable at relatively high concentrations of formic acid in the material fed into the azeotrope column. Specifically, the process is particularly effective in azeotropically distilling solutions containing at least around 70 to 75 weight percent formic acid at about atmospheric pressure. The presence of acetic acid is not critical in this regard, the process being capable of handling feed streams containing substantial amounts of acetic acid.

Another factor which must be taken into account in operating the azeotrope column is the existence of ternary azeotropes composed of formic acid, water, and the entrainer being employed. That is, the azeotrope column should be so operated that, in the aqueous solution produced as residue therefrom, the ratio of formic acid to water exceeds by at least a finite amount the formic acid:water ratio existing in said ternary azeotrope. This can be controlled by controlling the distillate-residue "split" in the column, decreasing the amount of distillate as necessary to increase the formic acid:water ratio in the residue. The ternary azeotropes formed by water, formic acid, and the several useable entrainer species can be determined experimentally at the pressure which is to be employed in the column. In the case of heptane entrainers, the formic acid:water ratio in question is approximately 2.3 (by weight) at a pressure of 1 atmosphere, which is a satisfactory pressure for operating the azeotrope column.

In that embodiment of the invention in which a topping column is employed in conjunction with the azeotroping column, consideration should be given to the maximum-boiling azeotrope which exists between formic acid and water (77.5 weight percent formic acid, 22.5 weight percent water, atmospheric boiling point 107.1° C) and the azeotrope generally identified as containing 20.4 weight percent acetic acid, 60.4 percent formic acid, and 19.2 percent water which boils at 107.1° C. Because of the formic acid-water azeotrope it is not feasible to attempt concentrating the material in the topping column to a formic acid concentration greater than 77.5 weight percent, except that by operating under elevated pressure, e.g., about 4 atmospheres absolute, it is possible to obtain a topped residue which is somewhat more concentrated, e.g., about 85 weight percent formic acid. This is at the expense of sharply increased corrosion rates experienced at high pressures, however, and ability to avoid distilling formic acid solutions at high pressures is one of the advantages of the present process. Likewise, when it is desired to operate the topping column with acetic acid being brought overhead in the distillate (to prevent continuing buildup of acetic acid within a cyclic system) the acetic acid-formic acid-water azeotrope requires that a certain quantity of formic acid be discharged from the system with the acetic acid. It has been discovered, however, that this distillate may actually contain somewhat less formic acid than the 60.4 percent set forth hereinabove and that the ratio of formic acid to acetic acid is actually nearer to 2:1 than 3:1. This makes more feasible the withdrawal of acetic acid from the system as distillate from the topping tower, i.e., the amount of formic acid discharged with the acetic acid is less than would be predicted from the literature.

It will be recognized that the constraint having to do with formic acid:water ratio in the residue of the azeotrope column discussed above also implies that the aqueous feed to the column should contain formic acid and water in at least a weight ratio of 2.3 when the entrainer being used is a heptane. Otherwise, a material balance of the column will show that no net production of anhydrous formic acid can result in the distillation. Commercially satisfactory operation obtains when the formic acid:water ratio in the residue of the topping tower is about 3.0, higher ratios being, of course, even more satisfactory.

The number of trays, and the reflux ratios, employed in the azeotrope column are also important process parameters. It should be mentioned also, before discussing these factors, that it is of unusual importance in practicing the present invention to bring the azeotrope column to steady-state operating conditions before beginning product takeoff. That is, even more than in most azeotropic distillations, it is important to attain a steady-state equilibrium distribution of the entrainer throughout the height of the column; otherwise, there is danger that water will appear in the distillate.

As has been mentioned previously, the topping column, when one is employed, advantageously contains about 50 actual operating trays (or their equivalent if the column is not a plate-type column, e.g., if it is a packed column). Operating conditions of the topping column are not critical to the present process, however, and can be varied widely in accordance with generally understood principles regarding the distillation of formic acid-water mixtures, with or without an acetic acid admixture. It is obvious, of course, that any organic light ends which are contained in the initial feedstock will be removed in the distillate from this column.

Concerning the azeotrope column, however, it has been found desirable to operate under more closely defined conditions. First, although fewer trays can be employed, especially if a batch distillation is employed rather than the preferred continuous distillation, it is recommended that the the column contain the equivalent of at least about 40 operating trays in the rectification section, 50 trays being more effective and 60 trays being actually preferred. In addition, the equivalent of at least about 15 operating stripping trays is recommended in a continuous distillation column. With about 60 rectification trays and with the distillation being conducted at essentially atmospheric pressure, it is recommended that there be employed as reflux into the head of the azeotroping column at least about 10 to 12, preferably 12, parts of formic acid for each part of formic acid withdrawn from the distillate receiver as product, together with at least enough of the entrainer that the vapors withdrawn from the head of the column contain at least about 1.0 part of the entrainer by weight for each part of formic acid contained in the withdrawn vapors (i.e., enough entrainer to satisfy the entrainer-formic acid azeotrope). When using fewer than about 60 rectification trays these reflux rates should be increased. For example, when using about 50 rectification trays the ratio of formic acid reflux to withdrawn formic acid product should be at least about 20/1, and with about 40 rectification trays the reflux ratio should be increased to about 30/1. These reflux ratio-tray combinations have been found effective with feedstocks containing substantial quantities of acetic acid, e.g., for 1 percent to about 20 percent.

Although it will ordinarily be desired to produce a comparatively pure formic acid product, i.e., one containing 99 percent or more formic acid and about 0.1 percent or less water, the process can be employed if desired to produce a product which, while still substantially anhydrous, contains some acetic acid. This is accomplished by decreasing the reflux ratio while still, however, observing the limitation of formic acid:water ratio in the base of the azeotroping column which has been discussed previously.

With feedstocks containing little or no acetic acid, e.g., around 1 percent or less, the reflux ratio, expressed as the ratio of formic acid reflux to withdrawn formic acid product, need not be as high as the 20/1 figure given above. Rather, it can be reduced to approximately 10/1 when the distillation column has about 50 rectifying trays without having more than about 1 percent water in the distillate. The higher reflux ratios set forth hereinabove are necessary to keep the acetic acid content of the distillate within the low range of less than about 1 percent, not to maintain a low water content.

The following example is given to illustrate the invention further. It will be recognized that many variations can be made therefrom within the scope of the invention.

EXAMPLE I

A feedstock comprising, by weight, 77.7 percent formic acid, 18.5 percent water, and 3.8 percent acetic acid was introduced continuously at the rate of 483 grams per hour onto the 15th tray from the bottom of a perforated plate-type distillation column approximately 50 mm in inside diameter and containing a total of 75 trays. The column was operated at atmospheric pressure at the head. It was equipped with a reboiler and condenser, the condenser being equipped with a distillate receiver adapted to operation as a decanter, i.e., having controls for the maintenance of two liquid phases therein with provision for drawing off liquid from each of the liquid phases in a controlled manner. A connection was provided for withdrawing a portion of the lower liquid phase as product distillate, and connections were also provided for returning, at a controlled rate, a liquid reflux stream from each of the liquid phases in the distillate receiver back into the head of the column (onto the top tray). An inventory of a hydrocarbon entrainer, i.e., n-heptane, amounting to approximately 20 grams was continuously maintained in the distillate receiver as the upper of the two liquid phases contained therein. The lower liquid phase maintained in the distillate receiver amounted to approximately 90 grams comprising, as will be explained more fully below, substantially anhydrous formic acid.

With the feedstock being continuously charged into the column as described above, and with residue being withdrawn continuously from the base of the column by liquid level control in the base, boilup heat was supplied through the reboiler in an amount sufficient to provide, at the head of the column, a continuous drawoff of approximately 115 grams per hour of distillate product from out of the system from the lower distillate receiver liquid phase and a continuous liquid reflux, returned to the head of the column, amounting to 2,243 grams per hour from the upper liquid phase, and 1,380 grams per hour from the lower liquid phase, contained in the distillate receiver.

The residue withdrawn from the base of the column amounted to 358 grams per hour and contained, by weight, approximately 71 percent formic acid, 5 percent acetic acid, and 24 percent water. The distillate product continuously withdrawn from the lower liquid phase contained in the distillate receiver amounted, as has already been stated, to about 115 grams per hour and contained, by weight, 99.5 percent formic acid along with 2,000 ppm of water, 3,000 ppm of acetic acid, and 100 ppm of heptane. The liquid contained in the upper liquid phase in the distillate receiver, none of which was withdrawn from the system, of course, comprised, by weight, approximately 99 percent n-heptane, 1 percent formic acid, and no detectable amount of acetic acid.

It can be calculated from the above that, for each part of formic acid withdrawn from the system as distillation product, approximately 12 parts were returned to the column as reflux. In the vapors withdrawn from the head of the column and introduced into the condenser, there were approximately 1.5 parts of n-heptane by weight for each part of formic acid contained therein.

The residue stream from the azeotropic distillation column just described is freed of a portion of the water contained therein by being recycled to the feed plate of a topping distillation column operating at at least atmospheric pressure and having at least about 50 trays. The topping column is fed, on the 20th tray from the bottom, with a mixture which, including the recycled azeotrope column residue, contains by weight about 59 percent formic acid, 33 percent water, 6 percent acetic acid, and 2 percent light ends including methyl ethyl ketone, ethyl acetate, and methyl acetate. The topping column is operated at a reflux ratio of about 1.5:1.

Distillate from the topping column comprises predominantly water, i.e., about 75 percent by weight, while the residue comprises, by weight, approximately 77.7 percent formic acid, 3.8 percent acetic acid, and 18.5 percent water. The residue is fed to the azeotrope column as described above.

EXAMPLE II

Other entrainers than n-heptane were employed in the azeotrope column with satisfactory results as tabulated below. The "entrainer:formic acid ratio" is the ratio of entrainer to formic acid obtaining in the azeotrope of the entrainer with formic acid existing at atmospheric distillation pressure. The "formic acid assay" is the formic acid content, in weight percent of the lower distillate receiver phase obtained upon allowing the azeotropic distillate to separate into two liquid phases at a temperature of approximately 25° C.

| Entrainer | Boiling Point, °C Entrainer | Azeo | Entrn'r Formic Acid Wt. Ratio in Azeo. | Formic Acid Assay |
|---|---|---|---|---|
| n-Hexane | 68.7 | 60.0 | 3:1 | 99+ |
| Methylcyclohexane | 100.9 | 78.3 | 1.5:1 | 99 |
| 2,2,4-Tri-methyl pentane | 99.2 | 77.8 | 1.3:1 | 90+ |
| 2,4-Dimethyl-hexane | 109.4 | 82.3 | 1.3:1 | 90+ |
| 2,5-Dimethyl-hexane | 109.1 | 82.3 | 1.3:1 | 99+ |
| Mixed "heptanes"(1) | 94–98 | 74 | 2:1 | 99 |
| 3-Methylheptane | 118.9 | 86.0 | 1:1 | 99 |
| Hexene-1 | 63.6 | 57.2 | 5.4:1 | 99+ |

(1) A commercial cut of predominantly seven carbon atom hydrocarbons comprising, by weight, approximately:

| n-Heptane | 37.0% |
|---|---|
| Aromatics | 1.6 |
| Cyclohexanes | 15.0 |
| Cyclopentanes | 15.9 |
| Isoheptanes | 29.9 |
| Normal paraffins | 0.6 |

Of the entrainers listed above, those boiling at about 120° C tend to entrain a perceptible quantity of water, although they are still useful. At about 115° C and below the water-entraining effect is negligible.

I claim:

1. A method for recovering substantially anhydrous formic acid from an aqueous solution comprising formic acid and water by means of distillation in the presence of an entrainer, the ratio of formic acid to water in said aqueous solution exceeding the ratio existing in any ternary azeotrope of formic acid, water, and said entrainer existing at the pressure employed for said distillation, which method comprises:

azeotropically distilling said solution in the presence of said entrainer, which is selected from the group consisting of non aromatic hydrocarbons having an atmospheric boiling point between about 60° C and about 120° C to separate said solution into a homogeneous aqueous residue and a distillate comprising formic acid and said entrainer; allowing said distillate to separate into two liquid phases, one comprising predominantly said entrainer and the other consisting essentially of formic acid; and drawing off a portion of said formic acid phase as the distillation product, the distillate:residue split obtained in said distillation being controlled so as to provide, in said homogeneous aqueous residue, sufficient formic acid that the formic acid:water ratio in said residue will be at least equal to that obtaining in said ternary azeotrope.

2. The method of claim 1 wherein the entrainer is a member of the group consisting of paraffins and saturated alicyclic hydrocarbons boiling between about 80° C and about 115° C, the distillation is conducted at substantially atmospheric pressure, and said ratio of formic acid to water is about 2.3.

3. The method of claim 2 wherein there is returned as reflux to the head of said tower enough of said entrainer that the vapors withdrawn from the head of the tower shall contain at least about 1.0 part of entrainer by weight for each part of contained formic acid.

4. The method of claim 3 wherein said aqueous solution contains more than about 1 percent acetic acid and wherein at least about 12 parts of formic acid reflux are returned to said column per part of formic acid distillation product and wherein there are provided in said column the equivalent of at least about 50 to 60 operating rectifying trays and at least about 15 operating stripping trays.

5. The method of claim 3 wherein said aqueous solution comprises, by weight, at least about 70 percent formic acid.

6. The method of claim 5 wherein said aqueous solution comprises, by weight, about 77 percent formic acid, 4 percent acetic acid, and 18 percent water.

7. A method for recovering substantially anhydrous formic acid from an aqueous solution comprising predominantly water and formic acid, which method comprises:

separating said solution, by a topping distillation, into an aqueous distillate and a residue comprising predominantly formic acid, the distillate:residue split in said topping distillation being controlled to produce a topped residue containing formic acid and water in a weight ratio of at least about 3:1 formic acid to water;

azeotropically distilling said topped residue in the presence of an entrainer which is a non-aromatic hydrocarbon having an atmospheric boiling point between about 60° and 120° C to separate residue topped resiude into a homogeneous aqueous stripped residue containing formic acid and water in a weight ratio of at least about 2.3 formic acid to water and a distillate comprising predominantly formic acid and said entrainer;

allowing said distillate to separate into two liquid phases, one comprising predominantly said entrainer and the other consisting essentially of formic acid;

drawing off a portion of said formic acid phase as the substantially anhydrous formic acid product;

employing said entrainer phase and a portion of said formic acid phase as reflux for said azeotropic distillation; and recycling at least a portion of said aqueous stripped residue to said topping distillation for the removal of additional quantities of water therefrom.

8. The method of claim 7 wherein the entrainer is a paraffinic or saturated alicyclic hydrocarbon having an atmospheric boiling point between about 80° C and about 115° C wherein, in said azeotropic distillation, there are employed as reflux at least about 10 to 12 parts of said formic acid phase for each part of formic acid phase withdrawn as product, together with enough of said entrainer that the vapors withdrawn from the head of the distillation column shall contain at least about 1.0 part of entrainer by weight for each part of contained formic acid.

9. The method of claim 8 wherein there are provided in the column employed for said azeotropic distillation the equivalent of at least about 60 operating rectifying trays and at least about 15 operating stripping trays.

10. The method of claim 9 wherein the azeotropic distillation is conducted at essentially atmospheric pressure.

11. The method of claim 10 wherein the topping distillation is conducted at at least atmospheric pressure and wherein the feed to the topping column comprises, by weight, about 59 percent formic acid, 6 percent acetic acid, and 33 percent water.

12. The method of claim 11 wherein the topping distillation is conducted at a pressure of about 3 atmospheres absolute in a distillation column having the equivalent of about 50 operating trays.

13. The method of claim 10 wherein the aqueous solution fed to the topping distillation contains acetic acid and wherein acetic acid accumulation in the distillation system is controlled by drawing off a portion of the stripped residue from the azeotropic distillation column before recycling the remaining portion to the topping distillation.

14. The method of claim 10 wherein the aqueous solution fed to the topping distillation contains acetic acid and wherein acetic acid accumulation in the distillation system is controlled by operating the topping column with a distillate:residue split such that acetic acid is removed in the distillate stream along with water.

* * * * *